(12) United States Patent
Kim et al.

(10) Patent No.: US 7,978,638 B2
(45) Date of Patent: Jul. 12, 2011

(54) METHOD OF TRANSMITTING NETWORK INFORMATION IN BROADBAND WIRELESS ACCESS SYSTEM

(75) Inventors: Yong Ho Kim, Gyeonggi-do (KR); Ki Hyoung Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 11/573,541

(22) PCT Filed: Aug. 9, 2005

(86) PCT No.: PCT/KR2005/002583
§ 371 (c)(1),
(2), (4) Date: Jul. 31, 2009

(87) PCT Pub. No.: WO2006/016766
PCT Pub. Date: Feb. 16, 2006

(65) Prior Publication Data
US 2009/0296615 A1    Dec. 3, 2009

(30) Foreign Application Priority Data
Aug. 9, 2004  (KR) .................. 10-2004-0062610

(51) Int. Cl.
G08C 17/02 (2006.01)
H04W 4/02 (2009.01)
H04B 7/212 (2006.01)
H04J 3/06 (2006.01)

(52) U.S. Cl. ........ 370/311; 370/330; 370/348; 370/350; 455/522; 455/433

(58) Field of Classification Search .......... 370/311–330, 370/335, 338, 340, 345, 347, 350, 503–512; 455/522, 343.2–343.4, 433
See application file for complete search history.

(56) References Cited

U.S. PATENT DOCUMENTS

| | | | |
|---|---|---|---|
| 6,477,382 B1* | 11/2002 | Mansfield et al. | 455/458 |
| 6,480,476 B1 | 11/2002 | Willars | |
| 7,142,520 B1* | 11/2006 | Haverinen et al. | 370/311 |
| 2005/0201311 A1* | 9/2005 | Willey et al. | 370/311 |

FOREIGN PATENT DOCUMENTS

| | | |
|---|---|---|
| JP | 11-252004 | 9/1999 |
| JP | 2002-092562 | 3/2000 |
| JP | 2003-143643 | 5/2003 |
| JP | 2005-136615 | 5/2005 |
| JP | 2005-348246 | 12/2005 |
| JP | 2006-518973 | 8/2006 |
| KR | 10-2004-0056440 | 7/2004 |
| WO | 00/22837 | 4/2000 |
| WO | WO 01/97549 A1 | 12/2001 |

* cited by examiner

Primary Examiner — Matthew Sams
(74) Attorney, Agent, or Firm — Lee, Hong, Degerman, Kang & Waimey (57) ABSTRACT

A method of transmitting network information in a broadband wireless access system is disclosed, in which a base station transmits mobile IP information received from a HA or FA to a mobile station in an idle mode. The present invention includes the steps of receiving a request for entering an idle mode from a mobile station, transmitting information of an admission for entering the idle mode to the mobile station, receiving the network information from a mobility agent, and transmitting a paging message including the network information.

8 Claims, 5 Drawing Sheets

------- 1st paging group -------
············· 2nd paging gropu ·············
— - — 3rd paging gropu — - —
———— 4th paging gropu ————

METHOD OF TRANSMITTING NETWORK INFORMATION IN BROADBAND WIRELESS ACCESS SYSTEM

CROSS-REFERENCE TO RELATED APPLICATIONS

This application is the National Stage filing under 35 U.S.C. §371 of International Application No. PCT/KR2005/002583, filed Aug. 9, 2005, which claims benefit of earlier filing date and right to priority to Korean Application No. 10-2004-0062610, filed on Aug. 9, 2004, the contents of which are all hereby incorporated by reference herein in their entirety.

TECHNICAL FIELD

The present invention relates to a mobile IP information transmitting method applicable to a broadband wireless access system, and more particularly, to a method of transmitting network information in a broadband wireless access system. Although the present invention is suitable for a wide scope of applications, it is particularly suitable for a base station to transmit mobile IP information received from a HA or FA to a mobile station in an idle mode.

BACKGROUND ART

Generally, a broadband wireless access system supports an idle mode and a sleep mode to reduce power consumption of a mobile station (MS).

In the sleep mode, the mobile station repeats sleep intervals and listening intervals. Namely, the mobile station, which does not perform a communication with a base station during the sleep interval, receives a traffic notification message (MOB-TRF-IND) from the base station once the listening interval begins. The mobile station then may acknowledge whether there is downlink traffic to be transmitted to the mobile from the base station using the received traffic notification message (MOB-TRF-IND). If the mobile station acknowledges there is the downlink traffic to be transmitted to the mobile station, the mobile station terminates the idle mode and then enters a normal mode. Meanwhile, if the mobile station acknowledges there is no downlink traffic to be transmitted to the mobile station, the mobile station does not perform the communication with the base station during the sleep interval. Hence, the mobile station in the sleep mode repeats the sleep and listening intervals, thereby reducing its power consumption.

Meanwhile, in the idle mode, the mobile station updates validity of the idle mode by receiving a paging message (MOB_PAG-ADV) each paging cycle. Namely, the mobile station, which communicates with the base station during the interval for receiving the paging message, can save power consumption. Unlike the mobile station in the sleep mode, the mobile station in the idle mode can move away into an area of another base station without performing handover within the same paging zone. Hence, the mobile station avoids power consumption caused by handover procedure.

A connection establishment using a mobile IP is explained as follows.

First of all, it is assumed that an IP mostly used in Internet environment can uniquely identify an access point of a certain node (e.g., host, router, etc.) using an IP address. In this case, a node should be located within a network including its IP address for receiving a datagram transmitted from a corresponding node. If the node fails to be located within the network including its IP address, the datagram cannot be transmitted to the node.

If a random node attempts to change its access point while keeping a communication, one of the two following methods should be adopted.

Firstly, the node changes its IP address each time the access point changes.

Secondly, an address of a moved host should be transmitted Internet overall.

Yet, the above two methods have problems.

According to the first method, it is difficult to maintain a connection between a transport layer and its higher layer when a location of the node is changed.

Assuming that the number of mobile nodes increases later, it is difficult to substantially adopt the second method.

Hence, a more extendible technology is needed to support mobility of node in Internet. And, a mobile IP is a solution to support the mobility.

In the mobile IP, a foreign agent (hereinafter abbreviated FA) or a home agent (hereinafter abbreviated HA) informs that a mobile station is located within which agent area using an agent advertisement message.

However, in the related art, not receiving the downlink data, the mobile station in the idle or sleep mode is unable to receive the agent advertisement message. So, the mobile station failing in receiving the agent advertisement message for a predetermined time terminates the idle or sleep mode and then enters the normal mode to transmit uplink information to search an HA or FA. Hence, it is unable to sufficiently take advantage of the idle or sleep mode.

DISCLOSURE OF THE INVENTION

Accordingly, the present invention is directed to a method of transmitting network information in a broadband wireless access system that substantially obviate one or more of the problems due to limitations and disadvantages of the related art.

An object of the present invention is to provide a method of transmitting network information in a broadband wireless access system, in which a base station transmits mobile IP information received from a HA or FA to a mobile station in an idle mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting network information, in which the network information is transmitted by a base station in a broadband wireless access system, according to the present invention includes the steps of receiving a request for entering an idle mode from a mobile station, transmitting information of an admission for entering the idle mode to the mobile station, receiving the network information from a mobility agent, and transmitting a paging message including the network information.

Preferably, the network information is an agent advertisement message.

Preferably, the mobility agent is a home agent (HA) or a foreign agent (FA).

Preferably, the further includes the step of transmitting a paging message including traffic generation information if a traffic to be transmitted to the mobile station is generated.

Preferably, the paging message including the network information is transmitted in a broadcast or multicast format to mobile stations in idle mode.

To further achieve these and other advantages and in accordance with the purpose of the present invention, a method of transmitting network information, in which the network information is transmitted by a base station in a broadband wireless access system, includes the steps of receiving network information of a location of the base station from a higher layer, transmitting a paging message (MOB_PAG-ADV) including a timing point of transmitting the network information and information about a connection identifier (CID) to mobile stations within the base station, and transmitting the network information via a channel corresponding to the connection identifier at the transmitting timing point.

To further achieve these and other advantages and in accordance with the purpose of the present invention, a method of receiving network information, in which the network information is received by a mobile station in a broadband wireless access system, includes the steps of transmitting a de-registration request message (DREG-REQ) for a request for entering an idle mode to a base station, receiving a de-registration command message (DREG-CMD) from the base station, entering the idle mode according to the de-registration command message, and receiving information about a home agent (HA) or a foreign agent (FA) in an area where the mobile station in the idle mode is located.

Preferably, the method further includes the step of receiving a timing point of transmitting the information about the home agent or the foreign agent and information of a connection identifier, wherein the information about the home agent or the foreign agent is transmitted via a channel corresponding to the connection identifier.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
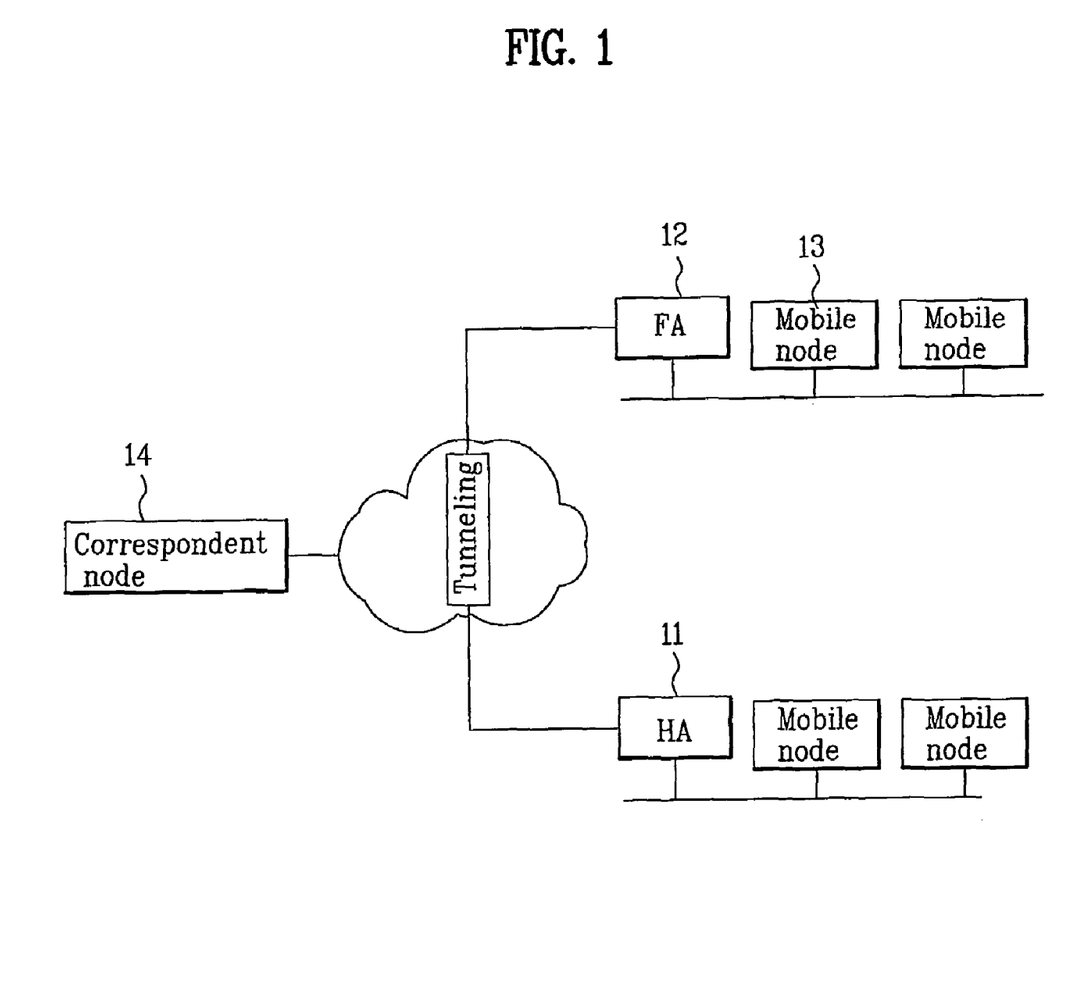
FIG. 1 is a diagram of a network supporting a mobile IP according to one embodiment of the present invention.

FIG. 1 is a diagram of a network supporting a mobile IP according to one embodiment of the present invention.

Referring to FIG. 1, a network supporting a mobile IP includes a home agent (HA) 11, a foreign agent (FA) 12 and a mobile node 13.

The HA 11 and FA 12 are nodes to transmit datagrams to the mobile node 13. If the mobile node 13 being communicating with a correspondent node 14 moves away into an external network from a home network, a supporting procedure is needed. The mobile IP operates as the following procedures.

First of all, the mobile node 13 performs a step of agent discovery. Namely, a mobility agent notifies its existence by an agent advertisement message that is similar to Internet control message protocol (ICMP) router discovery used for an Internet host to discover a router in conventional Internet. Alternatively, the mobile node 13 may obtain an agent advertisement message by transmitting an agent acquisition message. The agent advertisement message is periodically broadcasted. The mobile station failing in receiving the agent advertisement message for a predetermined time transmits an agent solicitation message to find a neighbor agent.

Once it is decided that the mobile node 13 lies within the external network by the above-explained agent discovery procedure, the mobile node 13 transmits a registration request message to the HA 11 and then receives a registration response message from the HA 11. And, the HA 11 registers a CoA (care-of-address) of the mobile node 13. The CoA includes an FA CoA and a co-located CoA. The FA CoA means that a temporary IP address is allocated to the mobile node 13 by a dynamic host configuration protocol (DHCP).

In the area into which the mobile station has moved, data allocated to the mobile station having the temporary IP address (CoA or co-located CoA) is transmitted to the HA to which the mobile station is registered. The HA attaches the temporary IP address of the mobile station to the received data and then transmits it to the FA 12. And, such a procedure is called tunneling. The FA 12 transmits the corresponding data to the mobile station. If data to be transmitted to a different node is generated from the mobile station, the data is transmitted to the FA 12 and the FA 12 delivers the data using an Internet routing protocol.

Figure 2:
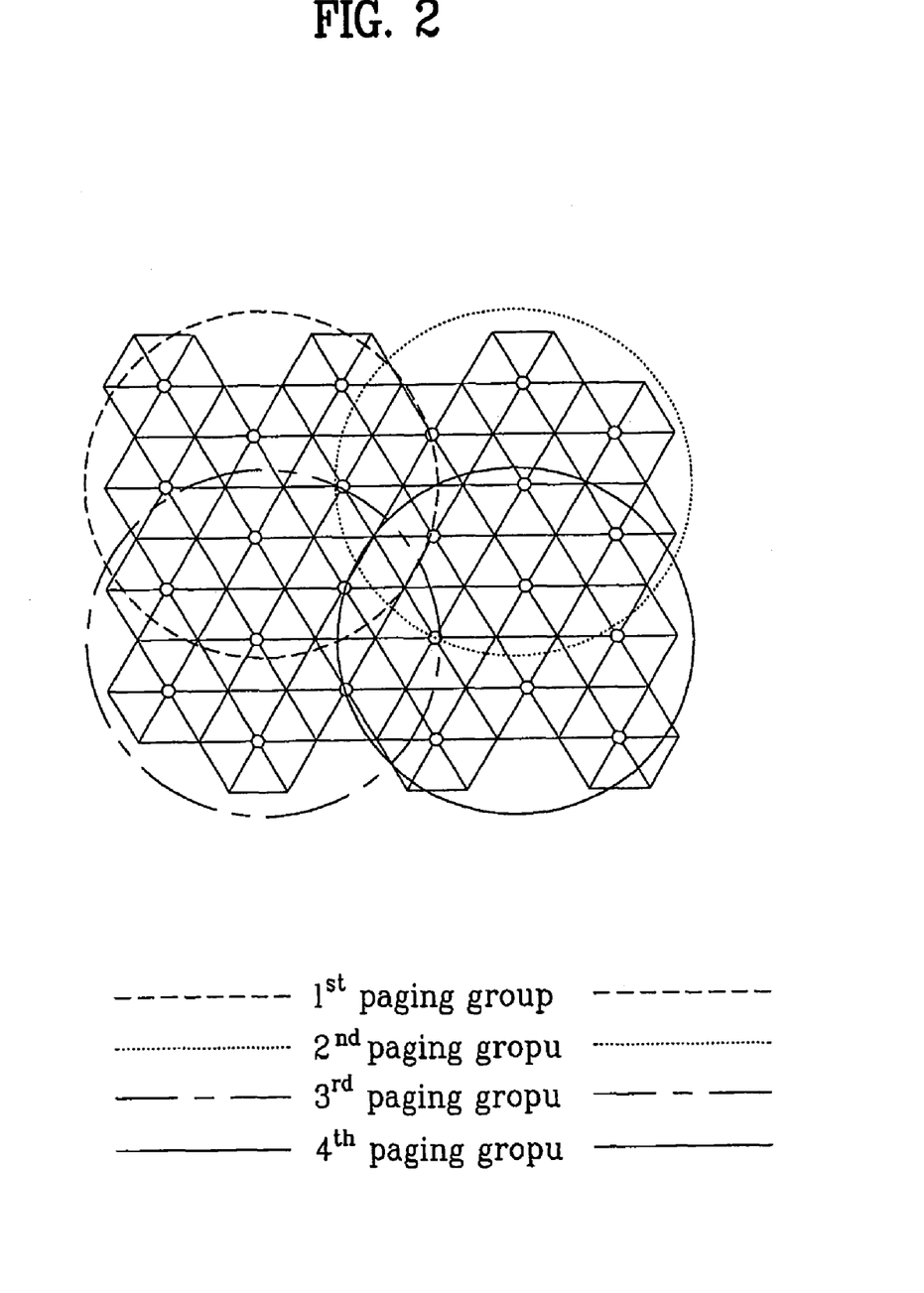
FIG. 2 is a diagram of a paging group according to one embodiment of the present invention.

FIG. 2 is a diagram of a paging group according to one embodiment of the present invention.

Referring to FIG. 2, a paging group comprises base stations supporting idle mode. A set of areas of the base stations belonging to the paging group are called a paging zone. A mobile station in idle mode can move away into another base station area without performing handover within the same paging zone. Each of the base stations within the same paging zone has the same paging cycle and offset. In this case, the paging cycle means a cycle by which a paging message (MOB_PAG-ADV) is transmitted. And the paging offset is set up for including information to be transmitted to a specific mobile station.

Meanwhile, a paging controller for controlling an idle mode may be provided. One paging controller can control an idle mode operation within at least one paging group. The paging controller may be provided to a specific base station. Alternatively, the paging controller can be independently implemented.

Figure 3:
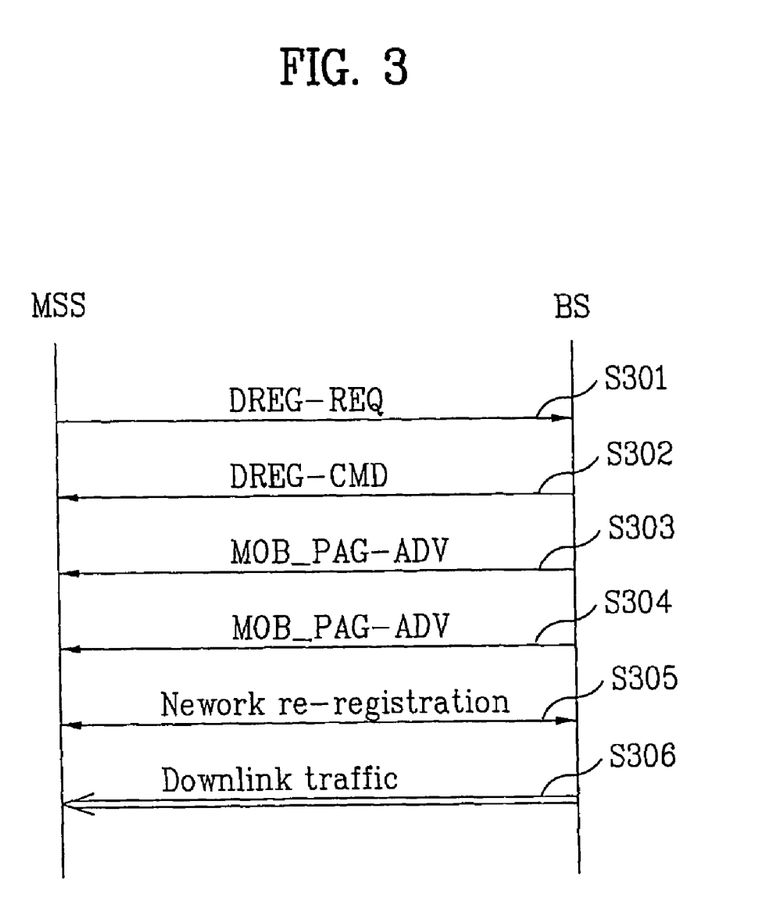
FIG. 3 is a flowchart of an idle mode operation according to one embodiment of the present invention.

FIG. 3 is a flowchart of an idle mode operation according to one embodiment of the present invention.

Referring to FIG. 3, a mobile station in normal mode can request for entering an idle mode to a base station through a de-registration request message (DREG-REQ) (S301). Table 1 shows an example of a de-registration request message.

TABLE 1

| Syntax | Size | Notes |
|---|---|---|
| DREG-REQ message_format( ) { | | |

TABLE 1-continued

| Syntax | Size | Notes |
| --- | --- | --- |
| Management Message Type = 49 | 8 bits | |
| De-registration-Request-Code | 8 bits | 0x00: MSS de-registration request from BS and network<br>0x01: Request for MSS de-registration from Serving BS and initiation of MSS idle mode<br>0x02-0x020xFF: reserved |
| TLV encoded parameters<br>} | Variable | |

Meanwhile, by transmitting a de-registration command message (DREG-CMD) including a paging zone identifier (Paging-group ID) corresponding to a paging zone to which the base station itself belongs, a paging cycle and a paging offset, the base station admits the mobile station to enter the idle mode (S302).

Table 2 shows an example of a de-registration command message.

TABLE 2

| Syntax | Size | Notes |
| --- | --- | --- |
| DREG-CMD_Message_Format( ) {<br>Management Message Type = 29<br>Action code<br>TLV encoded parameters<br>} | 8 bits<br>8 bits<br>Variable | |

Table 3 shows examples of action codes of a de-registration command message.

TABLE 3

| Action Code | Action |
| --- | --- |
| 0x00 | MSS shall leave the current channel and attempt to access another channel |
| 0x01 | MSS shall listen to the current channel but shall not transmit until an RES_CMD message of DREG_CMD with Action Code 0x00 is received. |
| 0x02 | MSS shall listen to the current channel but only transmit on the Basic, Primary Management, and Secondary Management Connections. |
| 0x03 | MSS shall return to normal operations and may transmit on any of its active connections. |
| 0x04 | MSS shall terminate current Normal Operations with the BS: the BS shall transmit this action code only in response to any SS DREG_REQ. |
| 0x05 | Require MSS de-registration from Serving BS and request initiation of MSS idle mode. |
| 0x06 | The MSS may retransmit the DREG_REQ message after the time duration (REQ-duration) given by. |
| 0x07 | The MSS shall not retransmit the DREG_REQ message and shall wait for the DREG-CMD message. |
| 0x08-0xFF | Reserved |

If the action code of the de-registration command message is set to '0x05', that means an idle mode admission, the following information is included in the de-registration command message using a TLV format.

Table 4 shows an example of TLV encoding of a de-registration command message.

TABLE 4

| Name | Type | Length | Value |
| --- | --- | --- | --- |
| Paging information | ? | 4 | Bits 15:0 - PAGING_CYCLE-Cycle in which the paging message is transmitted within the paging group.<br>Bits 23:16 - PAGING OFFSET - Determines the frame within the cycle in which the paging message is transmitted. Must be smaller than PAGING CYCLE value.<br>Bits 31:24 - Paging group the MSS is assigned to. |
| REQ-duration | ? | 1 | Waiting value for the DREG-REQ message re-transmission (measure in frames) |
| Paging Controller ID | oo | 6 | This is a logical network identifier for the serving base BS of other network entity retaining MSS service and operational information and/or administering paging activity for the MSS while in IDLE mode. |
| Idle Mode Retain information | pp | 1 | Idle Mode Retain information is provided as part of this message is indicative only.<br>Network Re-entry from idle mode process requirements may change at time of actual re-entry. For each bit location, a value of '0' indicates the information for the associated re-entry management messages shall not be retained and managed, a value of '1' indicates the information for the associated re-entry management message shall be retained and managed.<br>Bit #0: retain MSS service and operational information associated with SBC_REQ/RSP MAC management messages<br>Bit #1: Retain MSS service and operational information associated with PKM-REQ/RSP MAC management messages<br>Bit #3: Retain MSS service and operational information associated with Network<br>Bit #4: Retain MSS and operational information associated with Time of Day<br>Bit #5: Retain MSS service and operation information associated with TFTP MAC management messages<br>Bit #6: Retain MSS service and operational information associated with Full service (MAC state machines, CS classifier information, etc.) |

The base station transmits a paging announce message to base stations belonging to the same paging group or to a paging controller in case of being provided with the paging controller. And, the paging announce message includes a medium access control (hereinafter abbreviated MAC) address of a mobile station entering an idle mode, a paging cycle, a paging offset.

Table 5 shows an example of a paging announce message.

TABLE 5

| Field | Size | Notes |
|---|---|---|
| Message Type | 8 bits | |
| Sender BS-ID | 48 bits | Base station unique identifier (Same number as that broadcasted on the DL-MAP message) |
| Recipient BS-ID | 48 bits | Set to 0xffffff to indicate broadcast |
| Time Stamp | 32 bits | Number of milliseconds since midnight GMT (set to 0xffffffff to ignore) |
| Num MSS | 8 bits | Number of MSSs to page |
| For(j=0; j<Num MSS; j++) { | | |
| MSS MAC address | 48 bits | |
| Paging Group ID | 8 bits | The identifier of the paging group to which the MSS belongs |
| PAGING CYCLE | 16 bits | MSS PAGING CYCLE parameter |
| PAGING OFFSET | 8 bits | MSS PAGING OFFSET parameter |
| Action Code | 3 bits | 0: MSS enters Idle Mode<br>1: MSS exists Idle Mode<br>2: MSS should be paged to perform ranging to establish location and acknowledgement message<br>3: MSS should be paged to enter a network |
| Reserved | 5 bits | |
| } | | |
| Security field | TBD | A means to authenticate this message |
| CRC field | 32 bits | IEEE CRC-32 |

By receiving the paging messages (MOB_PAG-ADV) broadcasted from the base station with each paging cycle (S303, S304), the mobile station in the idle mode decides whether there is a downlink traffic for the mobile station, whether to perform ranging, whether to maintain the idle mode.

Table 6 shows an example of a paging message.

TABLE 6

| Syntax | Size | Notes |
|---|---|---|
| ksMOB_PAG-ADV_Message_Format( ) { | | |
| Management Message Type=?? | 8 bits | |
| Num_Paging_Group_IDs | 8 bits | Number of Paging Group IDs in this message |
| For(i=0; i<Num_Paging_Group_IDs; I++ { | | |
| Paging Group ID | 8 bits | |
| } | | |
| For(j=0; j<Num _MACs; j++) { | | Number of MSS MAC Addresses in message can be determined from the length of the message (found in the generic MAC header). |
| MSS MAC Address hash | 24 bits | The hash is obtained by computing a CRC24 on the MSS 48-bit MAC address. The polynomial for the calculation is 0X864CFB. |
| Action Code | 2 bits | Paging action instruction to MSS:<br>00 = No Action Required;<br>01 = Perform Ranging to establish location and acknowledge message;<br>10 = Enter Network; and<br>11 = Reserved |
| Reserved | 6 bits | |
| } | | |
| } | 5 bits | |

In case of acquiring the information, through the paging message, indicating that there exists the downlink traffic, the mobile station terminates the idle mode, performs re-registration to the network (S305), and then receives the downlink traffic (S306). Meanwhile, in case of being requested to perform ranging via the paging message, the mobile station performs the ranging. In case of receiving information indicating not to do any action, the mobile station maintains the idle mode without doing a specific action. In case that there exists an uplink traffic in the mobile station, in case that there exists a downlink traffic for the mobile station, or in case that the mobile station moves away into another paging zone, the mobile station terminates the idle mode. The base station informs other base stations belonging to the same paging group that the mobile station has terminated the idle mode. Each of the base stations having received the information deletes the mobile station from an idle mode mobile station list. Meanwhile, in case that the paging controller is provided, the idle mode mobile station list can be managed by the paging controller.

Figure 4:
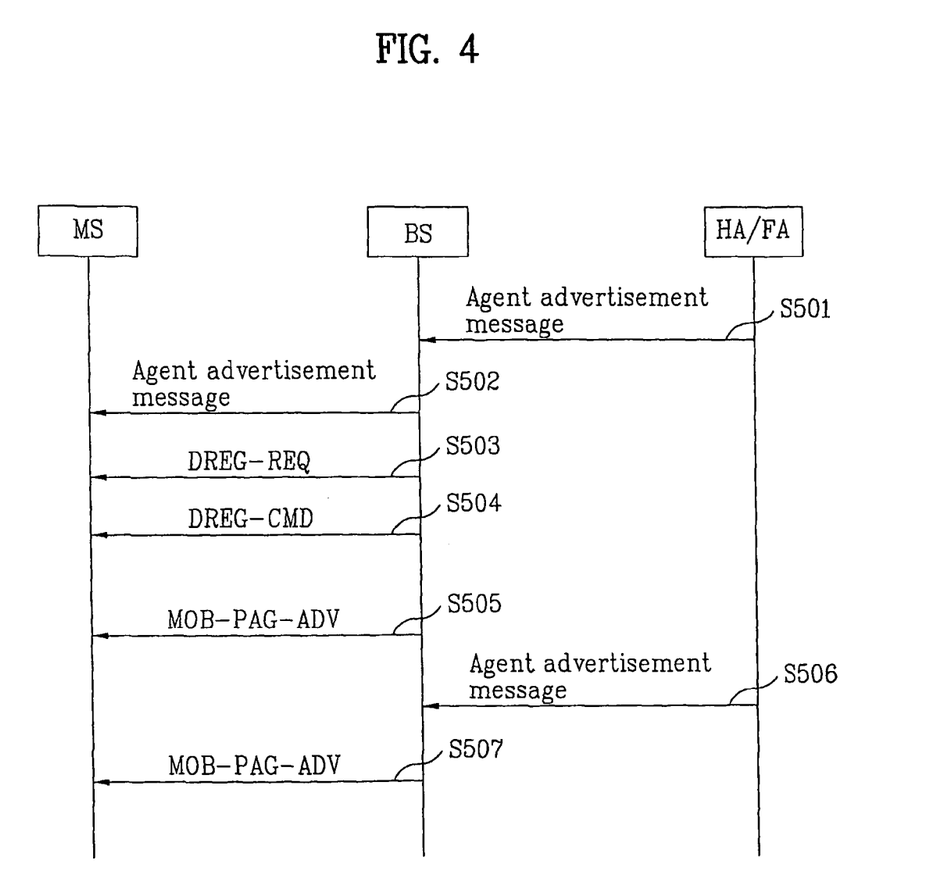
FIG. 4 is a flowchart of a method of transmitting an agent advertisement message according to one embodiment of the present invention.

FIG. 4 is a flowchart of a method of transmitting an agent advertisement message according to one embodiment of the present invention.

Referring to FIG. 4, a HA or FA periodically transmits an agent advertisement message to a base station (S501).

Table 7 shows an example of an agent advertisement message.

TABLE 7

| Vers = 4 | IHL | Type of Service | Total Length | IP Header [RFC791] |
|---|---|---|---|---|
| Identification | | Flags | Fragment Offset | |
| Time to Live = 1 | Protocol = ICMP | Header Checksum | | |
| Source Address = home and/or foreign agent's address on this link | | | | |
| Destination Address = 255.255.255.255 (broadcast) or 224.0.0.1 (multicast) | | | | |

TABLE 7-continued

| | | | | | | | | | |
|---|---|---|---|---|---|---|---|---|---|
| Type = 9 | Code | Checksum | | | | | | | ICMP Router |
| Num Addrs | Addrs Entry Size | Life Time (of this Advertisement) | | | | | | | Advertisement [RFC1256] |
| Router Address [1] | | | | | | | | | |
| Router Level [1] | | | | | | | | | |
| Router Address [2] | | | | | | | | | |
| Router Level [2] | | | | | | | | | |
| ... | | | | | | | | | |
| Type = 16 (maximum) | Length Registration | Sequence Number | | | | | | | Mobility Agent |
| Life Time | | R | B | H | F | M | G | V | Reserved | Advertisement |
| Care-of Address [1] | | | | | | | | | Extension |
| Care-of Address [2] | | | | | | | | | [RFC2002] |
| ... | | | | | | | | | |
| Type = 19 | Length | Prefix Length [1] | | Prefix Length [1] | | | | | Prefix-Length Extension [RFC2002] |

The agent advertisement message is valid only for a node connected to the HA or FA by one hop. Namely, the agent advertisement message is valid only for a node directly connected to the HA or FA without passing through another node. The base station transmits the agent advertisement message received from the HA or FA to the mobile station (S502).

In case that the mobile station is in normal mode, the base station transmits an agent advertisement message via a secondary management connection (SCM). The secondary management connection is a connection for transmitting messages associated with IP. The secondary management connection is established between the mobile station and the base station in process of initial network access.

The mobile station transmits a de-registration request message (DREG-REQ) to the base station to enter an idle mode (S503). The base station permits the mobile station to enter the idle mode by transmitting a paging cycle and a paging offset via a de-registration command message (DREG-CMD) (s504).

The base station having transmitted the de-registration command message releases a radio resource for the mobile station and transmits a paging message with each paging cycle (S505, S507).

Meanwhile, the base station periodically receives the agent advertisement message from the HA or FA (S506) and transmits a paging message (MOB-PAG-ADV) including the received agent advertisement message to mobile stations in idle mode within a corresponding zone (S507).

Table 8 shows an example of a paging advertisement message including an agent advertisement message.

TABLE 8

| Syntax | Size | Notes |
|---|---|---|
| MOB_PAG-ADV_Message_Format( ) { | | |
| Management Message Type=?? | 8 bits | |
| Num_Paging_Group_IDs | 8 bits | Number of Paging Group IDs in this message |
| For(i=0; i<Num_Paging_Group_IDs; I++ { | | |
| Paging Group ID | 8 bits | |
| } | | |
| For(j=0; j<Num _MACs; j++) { | | Number of MSS MAC Addresses in message can be determined from the length of the message (found in the generic MAC header). |
| MSS MAC Address hash | 24 bits | The hash is obtained by computing a CRC24 on the MSS 48-bit MAC address. The polynomial for the calculation is 0x864CFB. |
| Action Code | 2 bits | Paging action instruction to MSS: 00 = No Action Required; 01 = Perform Ranging to establish location and acknowledge message; 10 = Enter Network; and 11 = Reserved |
| Reserved } | 6 bits | |
| TLV encoded Advertisement | variable | TLV specific |
| } | 5 bits | |

Figure 5:
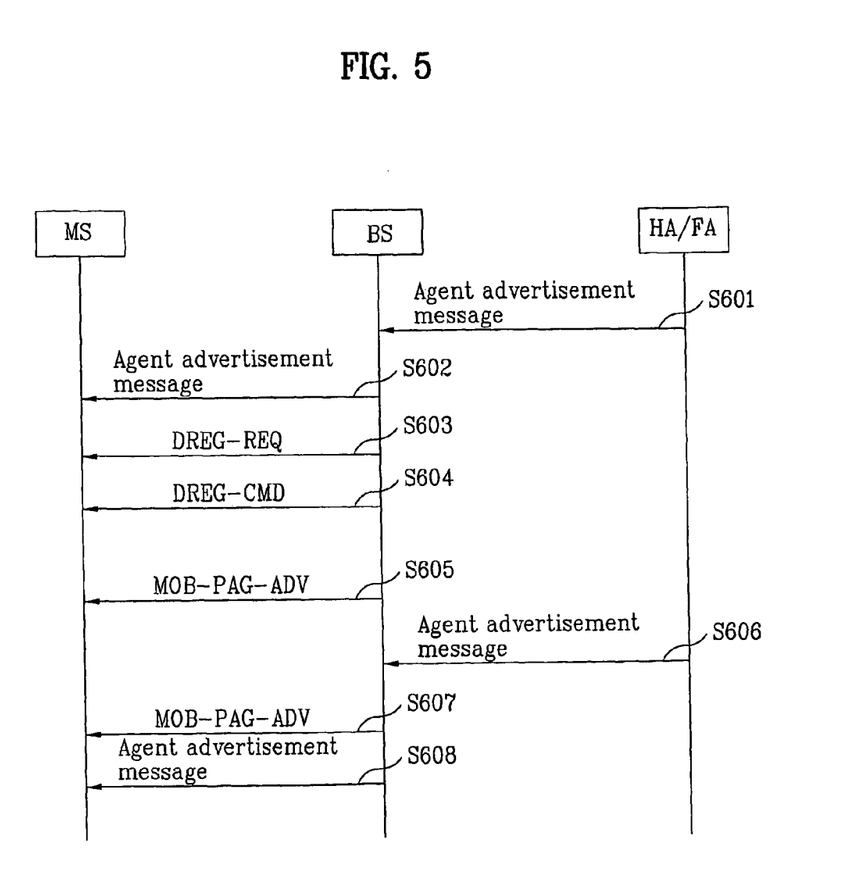
FIG. 5 is a flowchart of a method of transmitting an agent advertisement message according to another embodiment of the present invention.

FIG. 5 is a flowchart of a method of transmitting an agent advertisement message according to another embodiment of the present invention.

Referring to FIG. 5, a HA or FA periodically transmits an agent advertisement message to a base station (S601).

The agent advertisement message is valid only for a node connected to the HA or FA by one hop. Namely, the agent advertisement message is valid only for a node directly connected to the HA or FA without passing through another node. The base station transmits the agent advertisement message received from the HA or FA to the mobile station (S602).

In case that the mobile station is in normal mode, the base station transmits an agent advertisement message via a secondary management connection (SCM). The secondary management connection is a connection for transmitting messages associated with IP. The secondary management message is established between the mobile station and the base station in process of initial network access.

The mobile station transmits a de-registration request message (DREG-REQ) to the base station to enter an idle mode (S603). The base station permits the mobile station to enter the idle mode by transmitting a paging cycle and a paging offset via a de-registration command message (DREG-CMD) (s604).

The base station having transmitted the de-registration command message releases a radio resource for the mobile station and transmits a paging message each paging cycle (S605, S607).

Meanwhile, the base station periodically receives the agent advertisement message from the HA or FA (S606). The base station having received the agent advertisement message from the HA or FA transmits a paging message to mobile stations in idle mode (S607). In this case, the paging message includes a timing point at which the agent advertisement message will be transmitted and information about a connection ID (hereinafter abbreviated CID) indicating that the agent advertisement message is an agent message.

The CID corresponds to a traffic channel number. In case of transmitting the agent advertisement message by multicast, it is able to use a common CID for mobile stations using a mobile IP. Meanwhile, in case of transmitting the agent advertisement message by broadcast, it is able to transmit the agent advertisement message using a CID corresponding to broadcast. For example, there is '0xffffffff' as the CID corresponding to the broadcast. The base station transmits the agent advertisement message to the corresponding mobile station over a traffic channel corresponding to a specific CID and to a specific time which are indicated in the paging message.

INDUSTRIAL APPLICABILITY

Accordingly, the present invention is applicable to a mobile communication system, and more particularly, to a broadband wireless access system.

And, by the present invention, network information can be efficiently transmitted to a mobile station in idle mode.

What is claimed is:

1. A method of transmitting network information at a base station in a broadband wireless access system, the method comprising:
   receiving a de-registration request message from a mobile station for requesting entry into an idle mode of the mobile station;
   transmitting a de-registration command message including paging cycle information and paging offset information to the mobile station;
   receiving an agent advertisement message from a home agent (HA) or a foreign agent (FA);
   transmitting a paging message to the mobile station in accordance with the paging cycle information and the paging offset information, the paging message including timing point information indicating a timing point when the agent advertisement message is to be transmitted and a connection identifier (CID) corresponding to a traffic channel number; and
   transmitting the agent advertisement message to the mobile station at the timing point using the traffic channel corresponding to the CID.

2. The method of claim 1, wherein the paging message is transmitted via a broadcast.

3. The method of claim 1, wherein the agent advertisement message is transmitted via a broadcast or a multicast.

4. The method of claim 1, wherein the CID is common to a plurality of mobile stations and the agent advertisement message is transmitted via a multicast using the CID.

5. The method of claim 1, wherein the agent advertisement message is transmitted via a broadcast using the CID for the broadcast.

6. A method of receiving network information at a mobile station in idle mode in a broadband wireless access system, the method comprising:
   transmitting a de-registration request message to a base station for requesting entry into the idle mode;
   receiving a de-registration command message including paging cycle information and paging offset information from the base station;
   entering the idle mode according to the de-registration command message;
   receiving a paging message from the base station in accordance with the paging cycle information and the paging offset information, the paging message including a timing point indicating when an agent advertisement message is to be transmitted and a connection identifier (CID) corresponding to a traffic channel number; and
   receiving the agent advertisement message from the base station at the timing point using the traffic channel corresponding to the CID.

7. The method of claim 6, wherein the CID is common to a plurality of mobile stations.

8. The method of claim 6, wherein the CID is used for a broadcast.

* * * * *